(12) United States Patent
May

(10) Patent No.: US 9,632,319 B2
(45) Date of Patent: Apr. 25, 2017

(54) ILLUMINATING MAGNIFIER APPARATUS

(71) Applicant: Richard L. May, Hardwick, MA (US)

(72) Inventor: Richard L. May, Hardwick, MA (US)

(*) Notice: Subject to any disclaimer, the term of this patent is extended or adjusted under 35 U.S.C. 154(b) by 0 days.

(21) Appl. No.: 15/170,013

(22) Filed: Jun. 1, 2016

(65) Prior Publication Data

US 2016/0274367 A1 Sep. 22, 2016

Related U.S. Application Data

(62) Division of application No. 14/052,748, filed on Oct. 13, 2013, now Pat. No. 9,377,615.

(51) Int. Cl.
| | |
|---|---|
| *G02B 27/02* | (2006.01) |
| *G02B 25/02* | (2006.01) |
| *F21V 29/70* | (2015.01) |
| *F21V 23/00* | (2015.01) |
| *G02B 7/02* | (2006.01) |
| *G02B 25/00* | (2006.01) |
| *F21Y 101/02* | (2006.01) |

(52) U.S. Cl.
CPC .......... *G02B 27/025* (2013.01); *F21V 23/003* (2013.01); *F21V 29/70* (2015.01); *G02B 7/028* (2013.01); *G02B 25/002* (2013.01); *G02B 25/02* (2013.01); *F21Y 2101/02* (2013.01)

(58) Field of Classification Search
USPC ....... 359/802, 803, 804, 805, 806, 808, 809, 359/810, 811; 362/23.17, 611, 612, 555, 362/227, 311.02
See application file for complete search history.

(56) References Cited

U.S. PATENT DOCUMENTS

| | | | |
|---|---|---|---|
| 2005/0036191 A1* | 2/2005 | Schuttinger | ............ G02B 25/02 359/246 |
| 2009/0067066 A1* | 3/2009 | Feng | .................... G02B 25/008 359/801 |

* cited by examiner

*Primary Examiner* — Joseph P Martinez
*Assistant Examiner* — Brandi Thomas

(57) ABSTRACT

An illuminating magnifier has an annular housing with an underside, an inner edge defining an opening and an outer edge. A magnifying lens fills the opening, which lens has an optical axis. Light emitting diodes are distributed about the axis at the underside of the housing, each diode, when energized, producing a relatively wide angle conical light beam with a central hot spot cone which cart illuminate a viewing field below the lens. Special mounting surfaces at the housing underside aim the diodes in the diode array at selected angles relative to the lens axis so that the conical light beams therefrom overlap and all points in the viewing field are illuminated by the light beam from each diode and a center region of that field around the axis is illuminated by the hot spot cones of all the diodes.

9 Claims, 10 Drawing Sheets

ILLUMINATING MAGNIFIER APPARATUS

CROSS-REFERENCE TO RELATED APPLICATIONS

This application is a continuation-in-part application of application Ser. No. 13/171,522 filed Jun. 29, 2011.

BACKGROUND

1. Field of Use

This invention concerns a magnifier to facilitate inspecting work-pieces and parts. It relates especially to such a magnifier which also illuminates the work-piece or part being inspected.

2. Description of Prior Art (Background)

Conventional illuminating magnifiers have a housing which supports a large magnifying lens through which a worker may look to view a work-piece or part positioned below the lens. The housing also contains a light source to illuminate the lenses field of view. In the past, the light source often consisted of a fluorescent bulb encircling the lens and centered on the lens axis along with ballast powered by a 110 volt AC power source. Such bulbs are not environmentally friendly because they contain mercury and the presence of such high voltage in the magnifier is a potential hazard to the worker. Most importantly, the fluorescent light in the viewing area is not as bright and uniform as might be desired to enable a worker to carefully examine a work-piece in the viewing field of the lens.

More recently, magnifiers have been developed which utilize light-emitting diodes as the light source. However, invariably such diodes are of the bottle type with an integral lens which focuses the light from the diode to a point. Therefore, when pluralities of these diodes are arranged around the lens axis, the focused beams therefrom form a ring of hot spots at a fixed distance below the lens. Thus the amount of light incident on a work-piece or part being examined changes when the part is manipulated or the magnifier is moved up or down, thus increasing the chances of an examiner missing a defect in the part.

Other drawbacks of prior magnifiers are that they are not ergonomically friendly and do not give the worker enough control over the intensity and direction of the light incident on the work-piece being examined to enable a very careful examination of that part from all sides.

BRIEF SUMMARY

Accordingly, the present invention aims to provide an improved illuminating magnifier for examining a work-piece or part.

Another object of the invention is to provide an illuminating magnifier including a lens having an optical axis and a plurality of wide angle light emitting diodes distributed around the axis to illuminate a work-piece or part.

A further object is to provide such a magnifier each of whose diodes produces a light beam which covers a much wider area than the viewing field of the lens so that the light arrives at each point in that field from all angles.

Yet another object of the invention is to provide a magnifier of this type all of whose light emitting diodes produce light beams having hot spot cones which converge to provide a relatively large central region around the lens view axis optimized for viewing.

A further object of the invention is to provide an illuminating magnifier wherein the light incident on the part being examined is not appreciably diminished when the part or the magnifier is moved up or down during the examination.

Still another object of the invention is to provide a magnifier which allows close control over the intensity and/or direction of the light illuminating a work-piece being inspected.

The invention is also directed towards a single piece die-cast magnifier housing apparatus for illuminating and magnifying a specimen. The housing apparatus includes an inner edge defining an opening with a central axis and an underside. The underside includes a plurality of thermal stanchion pairs formed integrally with the magnifier housing. Each of the plurality of thermal stanchion pairs is substantially a cuboid shape and comprises a first rounded vertical side; a second rounded vertical side disposed substantially opposite the first rounded vertical side; and a top surface disposed between the first rounded vertical side and the second rounded vertical side. The first rounded vertical side of the thermal stanchion is narrower (heel) than the second rounded vertical side (toe). Thus, the structure of each of the thermal pedestal pairs is passively adapted to efficiently and quickly dissipate heat from the top surface heel side to the magnifier housing and the second rounded vertical side (toe) side.

In accordance with one embodiment of the present invention a die-cast magnifier housing apparatus for illuminating and magnifying a specimen is provided. The die-cast apparatus includes an inner edge defining an opening lying in a plane with a central axis and an underside. The underside of the die-case housing apparatus includes a plurality of thermal stanchion pairs formed integrally with the magnifier housing, wherein each of the plurality of thermal stanchion pairs is substantially a cuboid shape and includes a first rounded vertical side; a second rounded vertical side disposed substantially opposite the first rounded vertical side; a top surface disposed between the first rounded vertical side and the second rounded vertical side. The top surface disposed between the first vertical rounded side and the second rounded vertical side includes a sloping top surface wherein the sloping top surface is sloped towards the central axis. In addition, the first rounded vertical side of the thermal stanchion is narrower (heel) than the second rounded vertical side (toe); and each of the plurality of thermal pedestal pairs is passively adapted to dissipate heat from the top surface heel side to the magnifier housing and the second rounded vertical side (toe) side. In one embodiment the plurality of thermal stanchion pairs includes: a first group of thermal stanchion pairs, wherein the sloping top surfaces within the first group of thermal stanchion pairs comprises a slope angle of substantially 15 degrees; a second group of thermal stanchion pairs, wherein the sloping top surfaces within the second group of thermal stanchion pairs comprises a slope angle of substantially 15 degrees; and a third group of thermal stanchion pairs, wherein the sloping top surfaces within the third group of thermal stanchion pairs comprises a slope angle of substantially 15 degrees. In an alternate embodiment each of the sloping top surfaces comprises a slope angle of substantially 13 degrees.

The invention accordingly comprises the features of construction, combination of elements and arrangements of parts which will be exemplified in the construction hereinafter set forth, and the scope of the invention will be indicated in the claims.

In general, the subject illuminating magnifier has an annular housing with an underside, an inner edge defining an opening and an outer edge. A magnifying lens fills that opening, which lens has an optical axis. A plurality of light emitting diodes are distributed about that axis at the underside of the housing, each diode, when energized, producing a conical light beam with a selected included angle and a relatively wide central hot spot cone and which can illuminate a viewing field below the lens. Special mounting surfaces at the housing underside aim the diodes at selected angles relative to the lens axis so that the conical light beams therefrom overlap and all points in the viewing field are illuminated by the light beam from each diode and a center region of the viewing field around the axis is illuminated by the hot spot cones of all the diodes.

As will be described in detail later, a controller in the magnifier enables control over the intensity and/or direction of the light incident on a work-piece being examined in the viewing field of the lens.

BRIEF DESCRIPTION OF THE DRAWINGS

For a fuller understanding of the nature and objects of the invention, reference should be made to the following detailed description taken in connection with the accompanying drawings, in which.

DETAILED DESCRIPTION

The following brief definition of terms shall apply throughout the application:

The term "outer" or "outside" refers to a direction away from a user, while the term "inner" or "inside" refers to a direction towards a user;

The term "comprising" means including, but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

Figure 1:
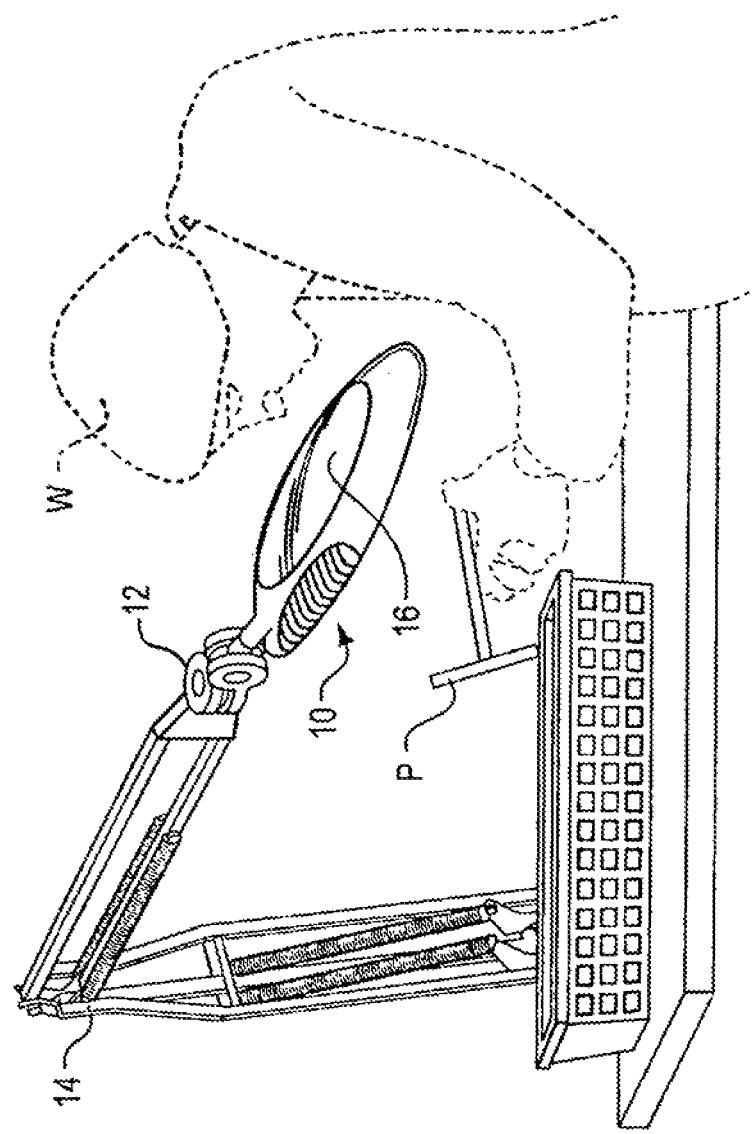
FIG. 1 is a perspective view of a worker using an illuminating magnifier incorporating the invention.

Referring to FIG. 1 of the drawings, an illuminating magnifier shown generally at 10 is mounted by way of a three-axis pivot joint 12 to the end of an articulating support arm 14. The magnifier is shown being used by a worker W to examine a work-piece or part P through a magnifying lens 16 in the magnifier. As we shall see, the magnifier includes a plurality of light, sources which illuminate the part P to facilitate its careful examination by the worker.

Figure 2:
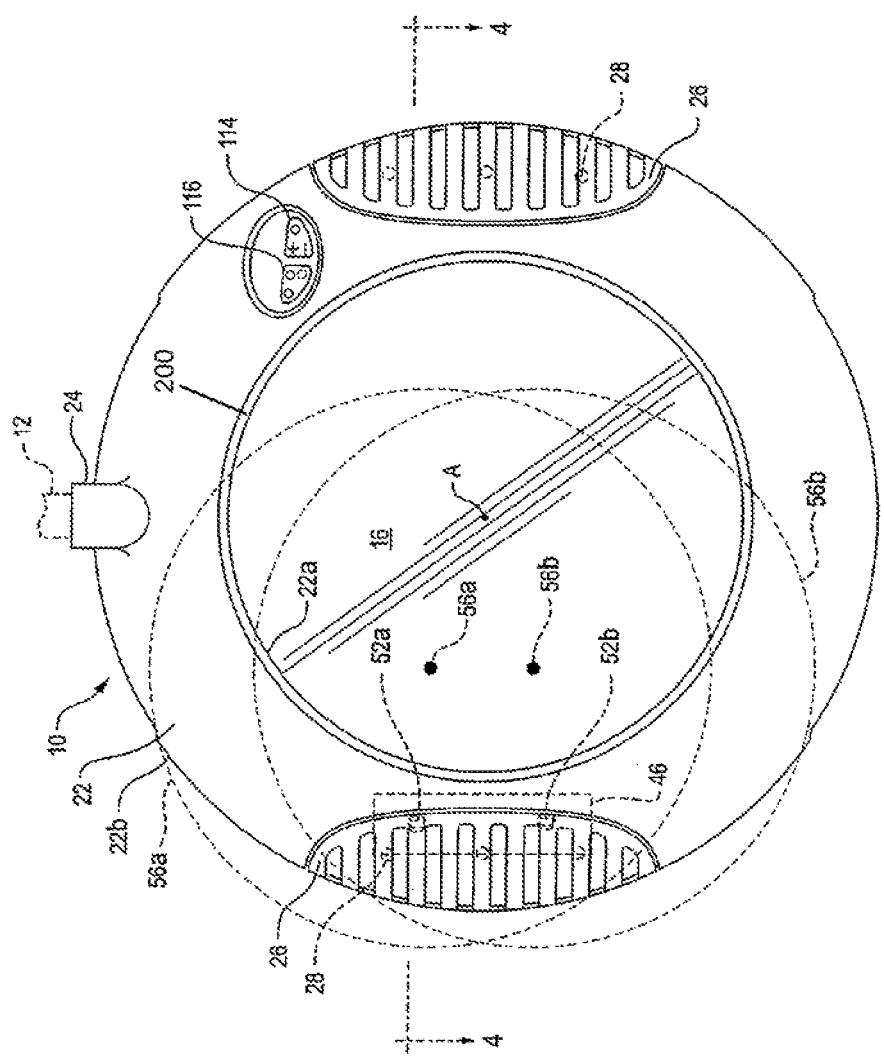
FIG. 2 is a top plan view on a larger scale showing the magnifier in greater detail.
Figure 3:
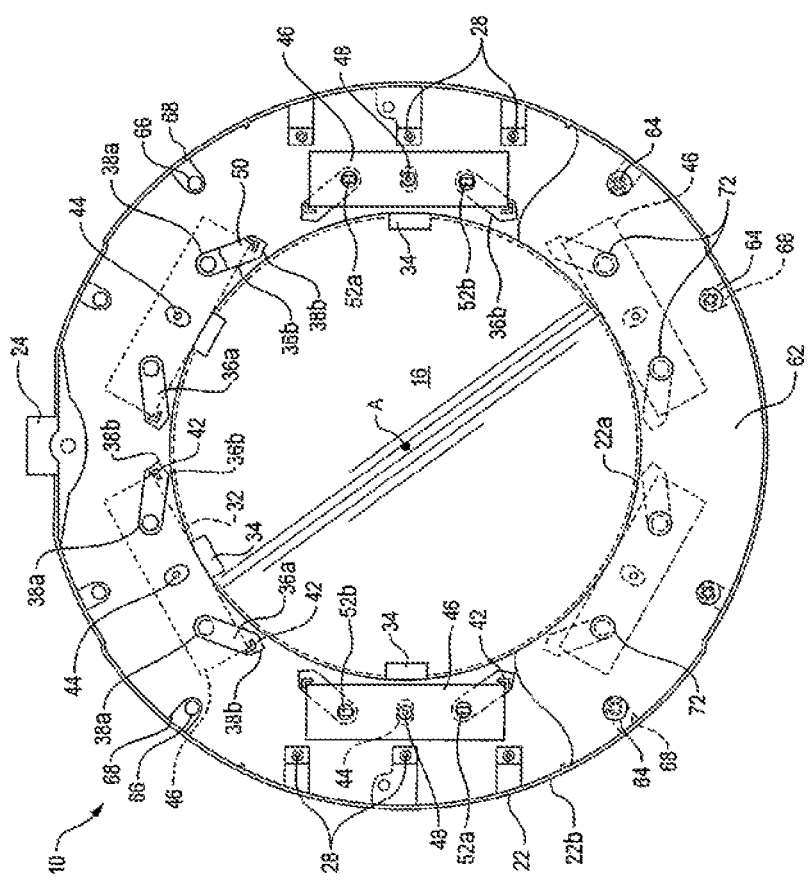
FIG. 3 is a bottom plan view with parts broken away thereof.

Referring now to FIGS. 2 and 3, the magnifier 10 comprises a circular housing 22 formed as an annulus having an opening 200 with inner edge 22a surrounding lens 16 and outer edge 22b formed as a skirt. Preferably, the housing is cast of a suitable lightweight metal such as aluminum. A tubular neck 24 extends radially out from housing edge 22b by which the magnifier may be connected to the joint 12 depicted in FIG. 1.

As shown in FIG. 2, a pair of gripping surfaces 26 may be mounted to the top of housing 22 at the opposite sides thereof by which the worker W may grip the magnifier to adjust its position in space. The gripping surfaces 26 may be secured to the housing from below by means of threaded fasteners 28. Preferably, the grips 26 are a conductive alloy having a relatively lower thermal conductivity rating and are also resistant to oxidation and corrosion due to contact with the worker's hands. It will be appreciated that a conductive alloy minimizes the potential for a static charge potential. The grips 26 may be formed from any suitable alloy such as, for example, a Zinc alloy.

As best seen in FIG. 3, the housing inner edge 22a is part of a circular ledge 32 against which the lens 16 is seated. The lens, which has an optical axis A, may be held in place by a plurality of clips 34 fastened to the underside of the housing. Preferably, the lens 16 is a four diopter lens, rather than the usual three, and it has a focal length in the range of 5-12 inches. The worker W can readily adjust the magnifier in three dimensional space and the part P remains in focus while being manipulated by the worker during the inspection process. Thus, the magnifier is ergonomic and user friendly.

Referring to FIG. 3, formed in the underside of housing 22 are several pairs of raised, flat mounting surfaces 36a and 36b. In the illustrated embodiment, there are six pairs of mounting surfaces 36a, 36b located at 1, 3, 5, 7, 9 and 11 o'clock, treating housing 22 there as a clock face. In other words, there are mourning surfaces positioned at diametrically opposite locations in housing 22. The surfaces 36a, 36b of each pair are elongated and angled away from each other. More particularly, those surfaces have radially outer heels 38a located between edges 22a and 22b and spaced relatively close together and radially inner toes located near the housing edge 22b which are spaced farther away from each other. Each toe 38b is formed with a raised angulated stop 42. Also, a raised pedestal 44 extends out from the underside of housing 22 midway between the heels 38a of each pair of surfaces 36a, 36b. The height of the pedestal 44 is substantially the same as that of surfaces 36a, 36b.

Each pair of surfaces 36a, 36b and the intervening pedestal 44 are arranged to support and locate a generally rectangular printed circuit board (PCB) 46, with the two radially inner corners of the PCB being captured by the stops 42 on those surfaces. Each PCB 46 is secured to its support surfaces 36a, 36b by a securing device. While that device could be an adhesive, in the illustrated magnifier it is a threaded fastener 48 extending through a hole in the PCB and turned down into a corresponding hole in the associated pedestal 44.

As shown in FIG. 3, each PCB 46 carries at least one, herein two, light emitting diodes (LEDs) 52a and 52b. The diodes are positioned on the PCB so as to be disposed directly above the heels 38a of each pair of mounting surfaces 36a, 36b so that during the operation of the magnifier 10, heat produced by the diodes is conducted away efficiently by those surfaces and dissipated by the metal housing 22. Preferably, thermally conductive tape or comparable deformable material 50 is sandwiched between each PCB and its support surfaces to assure intimate thermal contact there between to optimize heat dissipation from electrical components on the PCBs to be described presently. Each PCB 46 also carries the circuit components necessary to drive and control the diodes as will be described in more detail later. It will be appreciated that the LEDs 52a and 52b lie in substantially the same plane as the lens opening.

In accordance with this invention, the flat mounting surfaces 36a, 36b supporting each PCB 46 are angled so that the PCB is tilted at a selected angle relative to axis A, substantially 13 degrees, to aim the diodes 52a, 52b on that PCB inward toward that axis A. However, it will be appreciated that any suitable tilt angle may be selected. For example, each of the mounting surfaces may be tilted anywhere between a range of 5 degrees to as much as 30 degrees. Preferably, diodes 52a, 52b produce light beams 55 (FIG. 4) each having a relatively wide included angle, in the range of 80° to 180°, preferably 120°, to provide relatively large, overlapping light hot spots on a flat surface or plane S spaced below the magnifier at the focal distance of lens 16. In FIGS. 2 and 5, for ease of illustration, these hot spots are indicated by the broken line circles 56a and 56b whose centers are indicated by large dots bearing corresponding alpha-numeric indicators. In actuality, since the diodes are tilted relative to axis A, the hot spots on surface S are somewhat elliptical. In FIG. 5, the associated PCB 46 supporting the diode pair creating the hot spots is indicated by a line L connecting those centers.

Referring to FIG. 3, the PCBs are protectively enclosed by an annular metal cover 62 which may be secured to the underside of housing 22 by fasteners 64 screwed into passages 66 in a circular array of radial pedestals 68 extending out from the underside of housing 22 adjacent the periphery thereof. Cover 62 is formed with a circular array of holes 72 located directly opposite the diodes 52a, 52b. Preferably each hole is upwardly flared to form a lip on the inner face of the cover so that a relatively small hole 72 will allow the wide angle light beam from the associated diode to be projected through that hole in the cover without the hole excessively exposing the corresponding PCB. Preferably also, the distance between the cover 62 and the diodes 52a, 52b is set so that heat is effectively conducted away from the diodes without obstructing the light beams projected therefrom.

It is important to note that since the housing 22 and cover 62 are made of metal instead of the usual plastic material and the housing 22 is electrically grounded, there is no static charge buildup on the housing that could adversely affect an electronic part P being examined.

Figure 4:
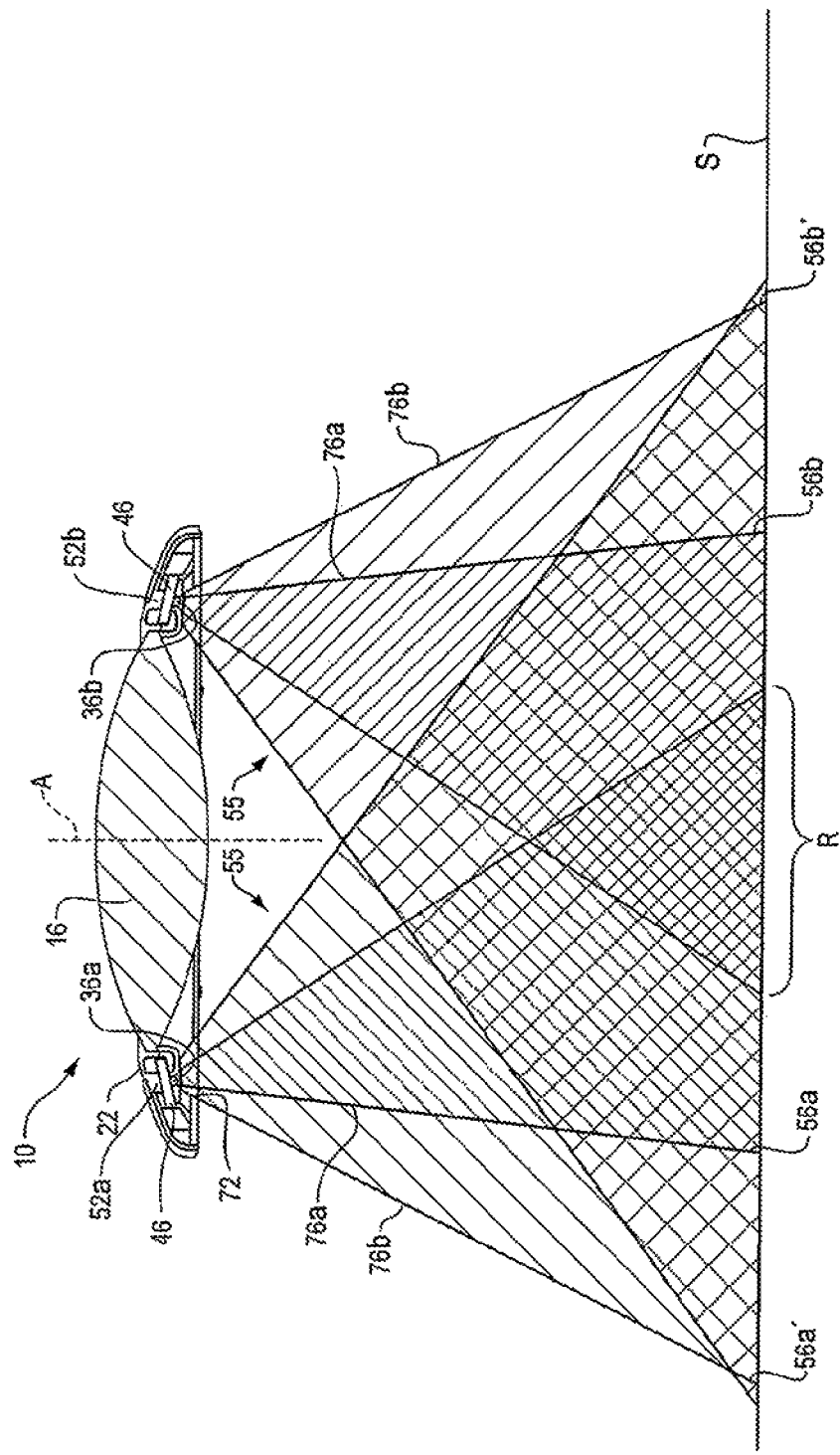
FIG. 4 is a sectional view taken along line 4-4 of FIG. 3 showing overlapping wide angle light beams produced by the magnifier.
Figure 5:
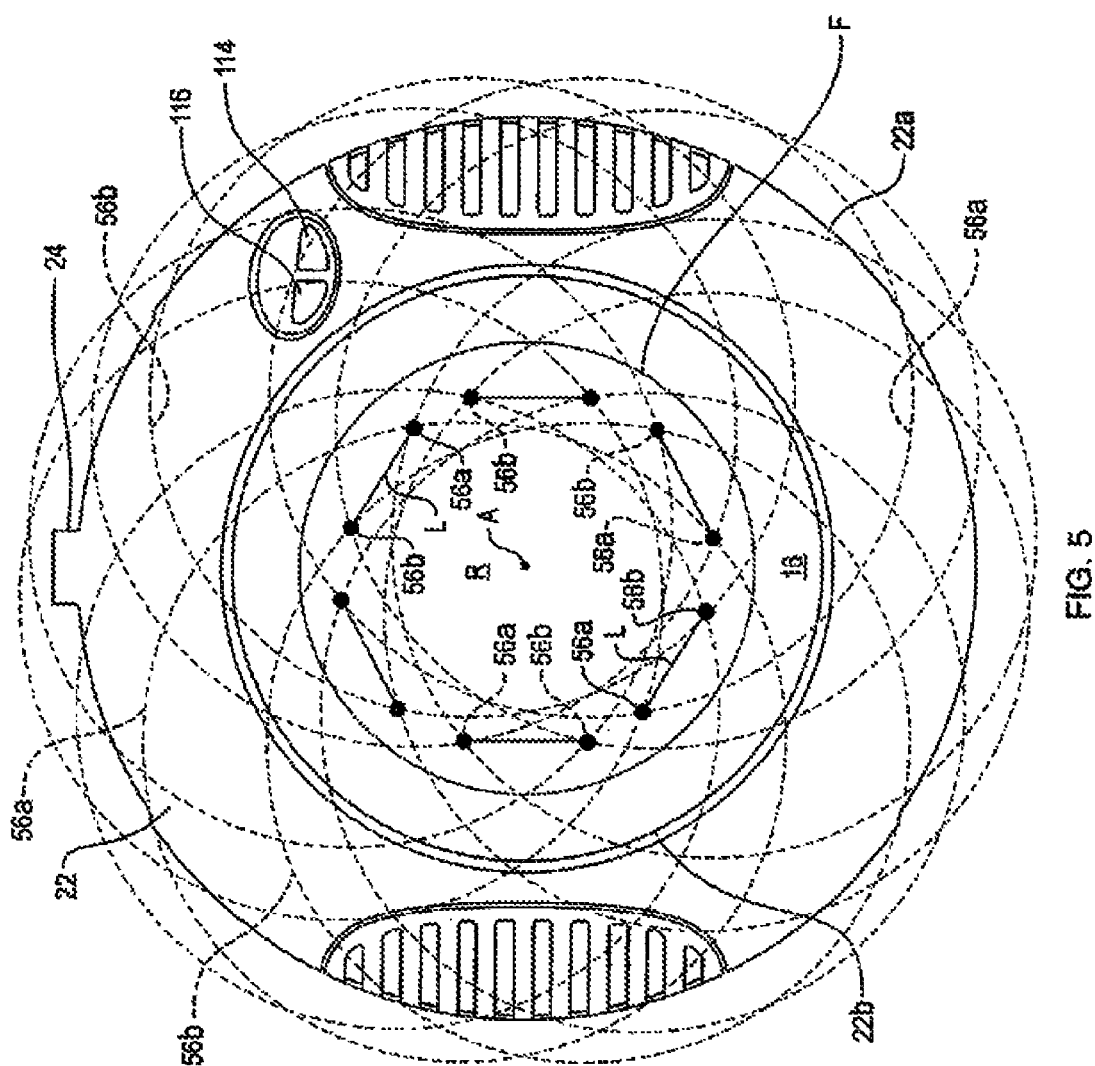
FIG. 5 is a diagrammatic view showing the operation of the FIG. 2 magnifier.

Referring now to FIG. 4, the light beam 55 from each diode 52a, 52b may be divided into a radially inner hot spot cone 76a which forms the aforementioned hot spot 56a or 56b on surface S and a radially outer cone of illumination 76b which forms a larger illumination area indicated by the larger broken line circle (ellipse) 56a' or 56b' on that surface. Only the hot spots 56a, 56b, are depicted in FIGS. 2 and 5. Due to the aforesaid tilt of the PCBs 46 caused by their angled mounting surfaces 36a, 36b, the cones of illumination 76b from the diodes intersect so that the circles of light 56a', 56b' overlap and cover an area much larger than the entire viewing field of lens 16 as represented by the solid line circle F in FIG. 5. That field F is smaller than lens 16 because of the latter's magnification. Also, the hot spots 56a, 56b of all the beams are superimposed on, and additively cover a relatively large center region R of the viewing area around axis A in FIG. 5. Since it receives the most light from all directions, this is the most important viewing region for the worker when inspecting a part P (FIG. 1).

In the preferred configuration shown in FIGS. 4 and 5, the aforesaid wide included angle of the light beams 55 in combination with the tilt angle of the PCBs cause each diode 52a, 52b to illuminate the entire viewing field F at the focal distance of the lens. This eliminates any shadows or is a homogenous light viewing field because the total light approaches each point in that field from many different angles. It will be appreciated that as the magnifier 10 is vertically raised or lowered for different magnification views the light throughout the viewing plane is homogenous or otherwise shadow-less.

Additionally, all points in field F receive light from the hot spot cone 76a of at least one diode, while the hot spot cones from all the diodes converge at the center region R. In this particular magnifier embodiment, all points within field F are covered by at least six hot spots 56a, 56b and the center region R is covered by twelve hot spots. Thus, the pan P being viewed through lens 16 remains bathed in uniform shadow-less light as the part is moved up and down and manipulated to present all sides thereof to the worker examining the part.

Figure 6:
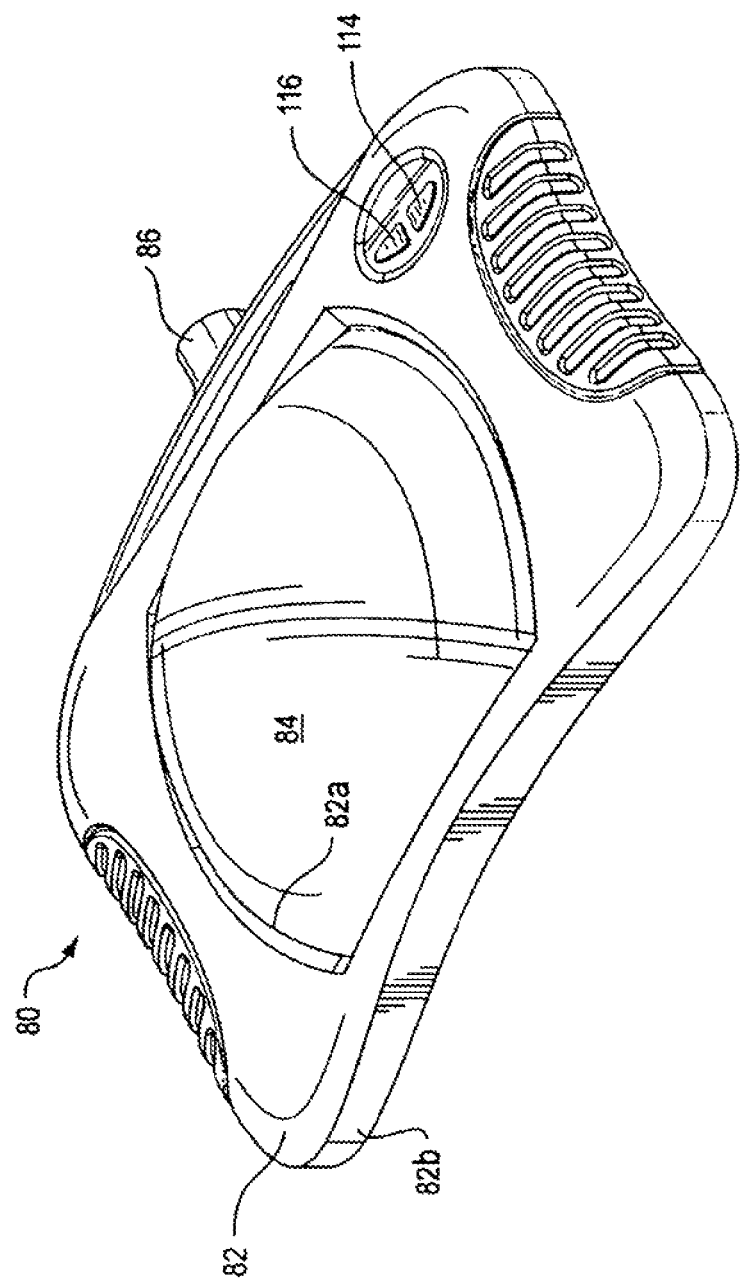
FIG. 6 is a perspective view from above illustrating a second magnifier embodiment.
Figure 7:
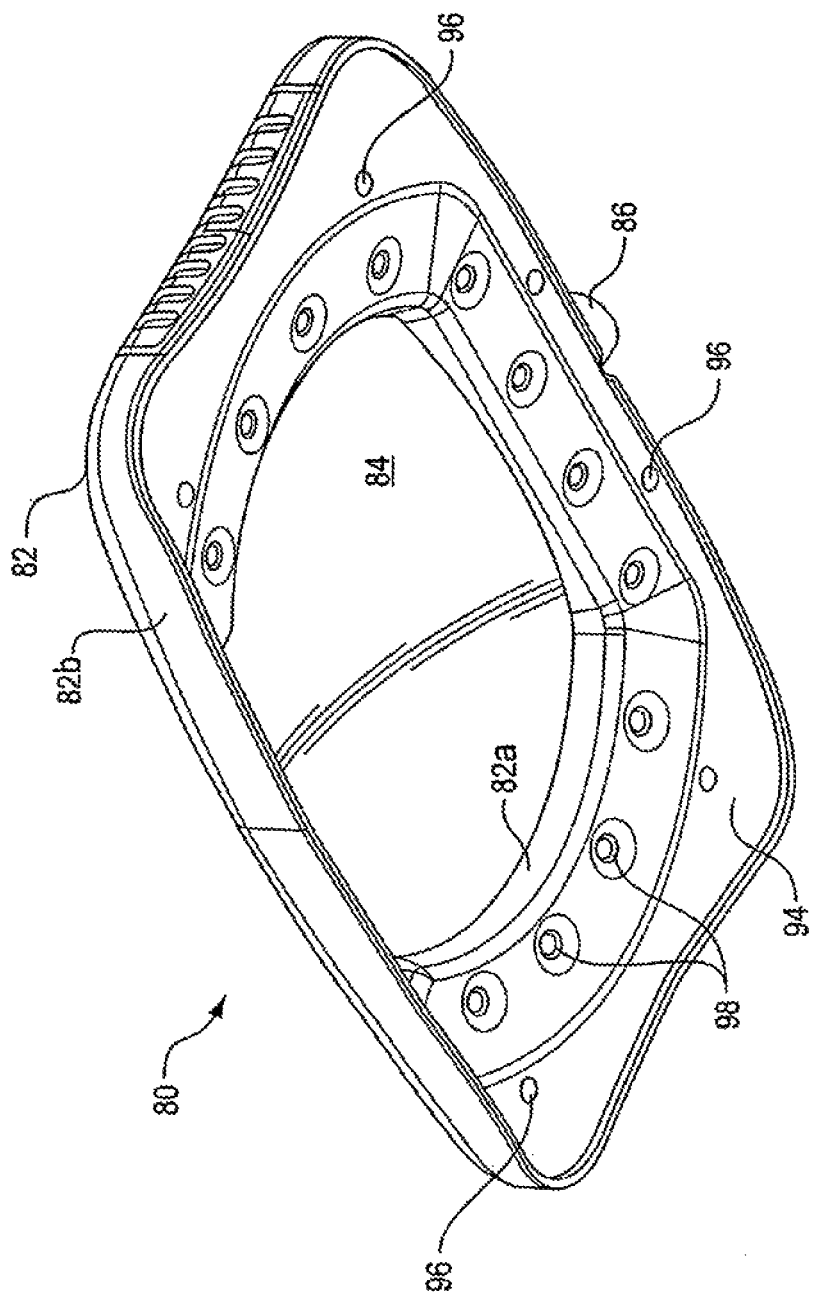
FIG. 7 is a perspective view from below thereof.
Figure 8:
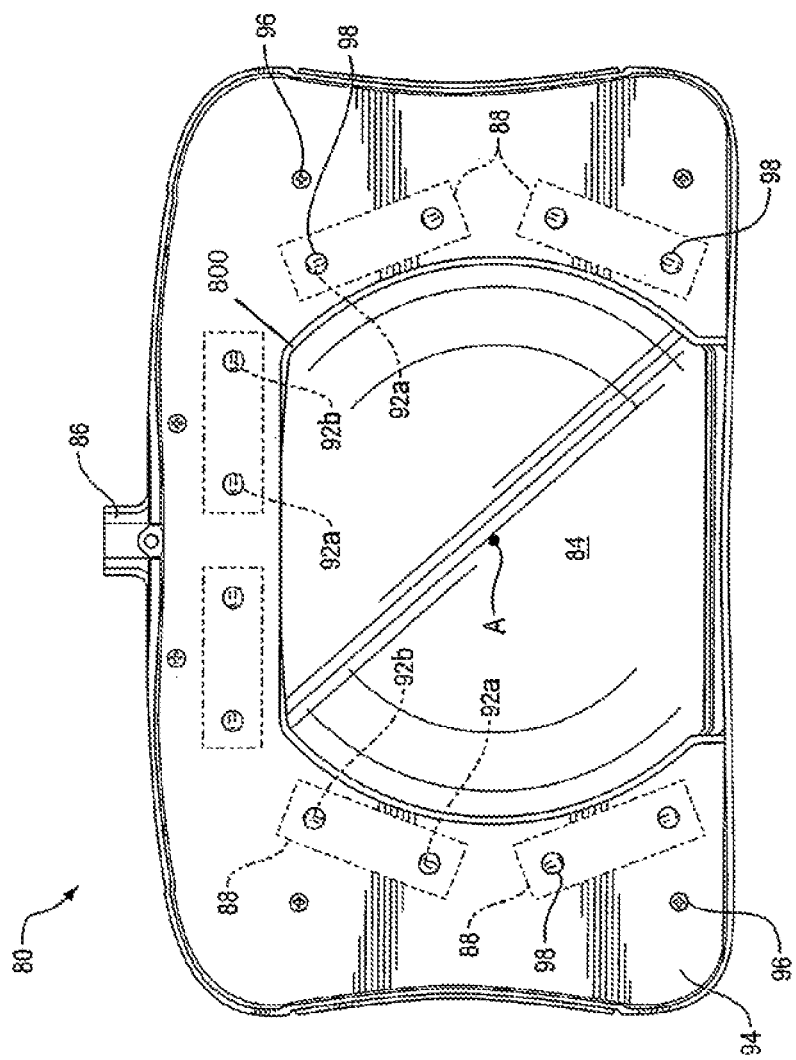
FIG. 8 is a bottom plan view thereof.

Turn now to FIGS. 6-8 which show generally at 80 a second magnifier embodiment which is more or less rectangular in shape. It includes a metal housing 82 formed as a rectangular annulus which housing has an inner edge 82a that defines an opening 800 for a magnifying lens 84 and an outer edge 82b formed as a skirt. A neck 86 extends from the back of housing 82 for attaching the magnifier to the 3-axis pivot joint 12 in FIG. 1. The lens 84, instead of being rectangular, has a semi-round shape to avoid the lens being overly thin at the tighter edges and corners thereof. As seen from FIG. 6, the lens is located quite close to the front of housing 22 and thus to the user, for optimum viewing.

As shown in FIG. 8, housing 82 contains an array of six PCBs 88 which may be the same or similar to the PCBs 46 described above in that each PCB 88 has two diodes 92a, 92b and the necessary support circuitry. As before, the bottom of housing 82 is closed off by a metal cover 94 secured to the housing by fasteners 96. Also as before, the cover has an array of flared holes 98 positioned directly opposite diodes 92a, 92b on circuit boards 88. In this magnifier embodiment, there are two PCBs 88 at the hack of housing 82, two at each side thereof and none at the front.

All of the PCBs are seated on mounting surfaces similar to surfaces 35a, 36b described above which are oriented and angled to tilt the PCBs 88 toward the optical axis A of lens 84. The mounting surfaces tilt the PCBs 88 and thus aim the wide angle light beams from the diodes 92a, 9b thereon in a manner similar to that described above in connection with magnifier 10.

In this embodiment, however, the PCBs are not positioned symmetrically about axis A. Accordingly; the mounting surfaces pairs may have slightly different angles of inclination to tilt their PCBs by different amounts. For example: a first group of thermal stanchion pairs supporting PCBs 88 at the back of the housing, may have a slope angle of substantially 15 degrees. A second group of thermal stanchion pairs supporting PCBS 88 on one side of the housing may have a slope angle of substantially 15 degrees; and a third group of thermal stanchion pairs supporting PCBS 88 on an opposite side of the housing may have a slope angle of substantially 15 degrees.

Figure 9:
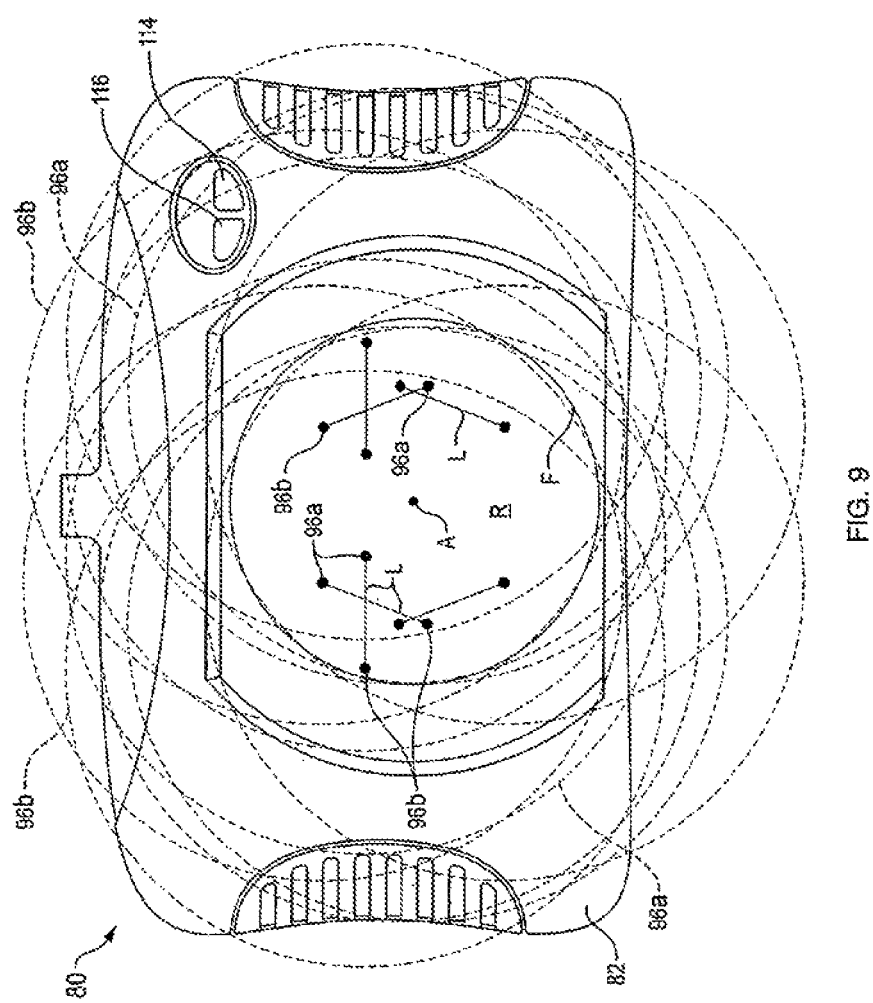
FIG. 9 is a diagrammatic view showing the operation of the FIG. 6 magnifier.

More particularly and referring to FIG. 9, due to the wide angle light beams from the diodes and the tilt of the PCBs 88, all points within the viewing field F of lens 84 are illuminated by the hot spots 96*a* and 96*b* produced by all the diodes 92*a* and 9*b*, respectively, i.e. seven in this example. Also, the clear center region R of field F is illuminated by the hot spots of all the diodes. Additionally, all points within the viewing field F in that figure are illuminated by an illumination cone similar to cone 76*b* in FIG. 4, that produces a much larger circle of illumination (not shown) from each diode 92*a*,92*b*. This eliminates all shadows as the light approaches each such point in the viewing field F from many different angles. Thus, the magnifier 80 has all the advantages discussed in connection with magnifier 10 plus others described above due to its rectangular shape and semi-round lens 84.

Figure 10:
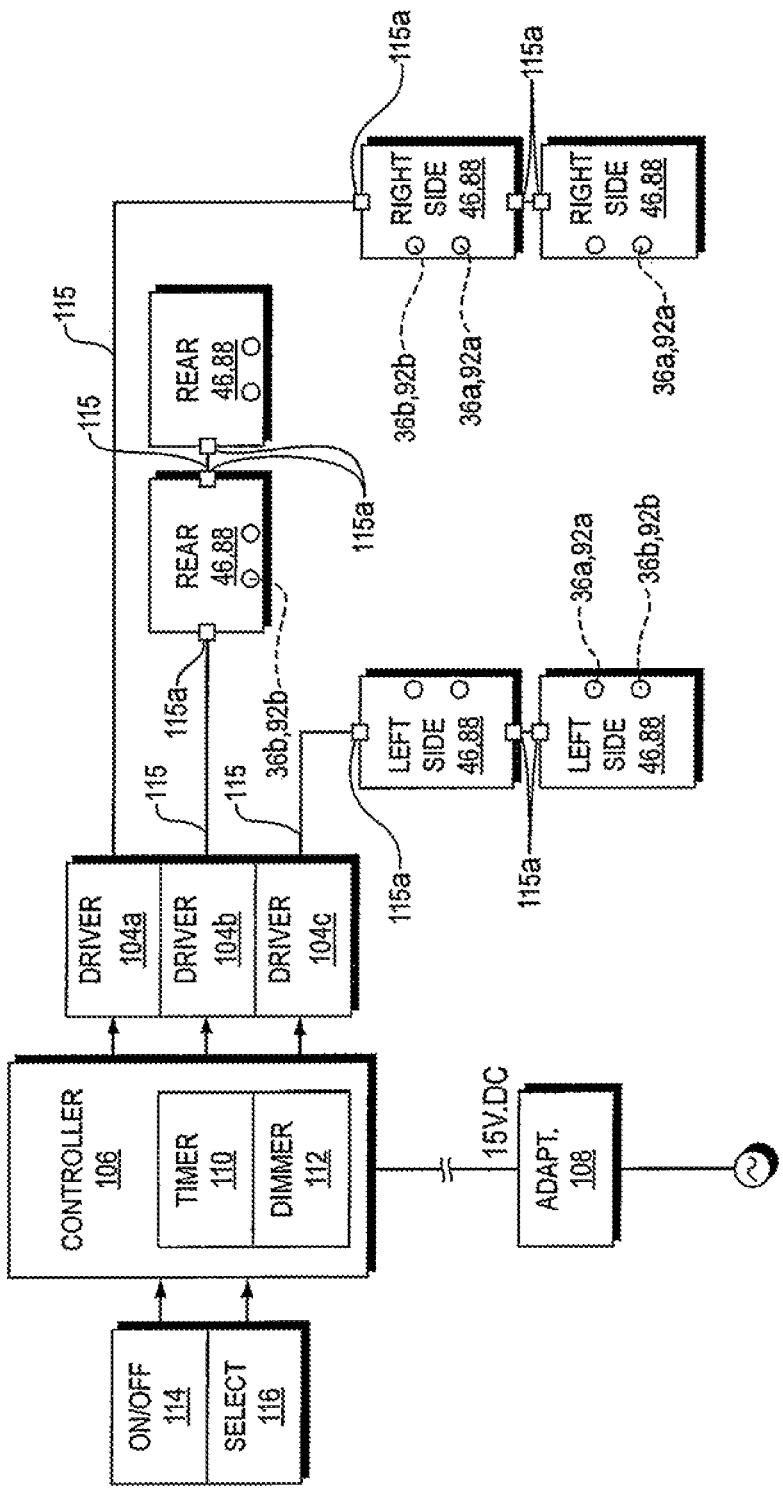
FIG. 10 is a block diagram of the FIGS. 1 and 6 magnifiers electrical systems.

Refer now to FIG. 10, preferably the diodes 52*a*, 52*b* and 92*a*. 92*b* are 3 watt diodes which are powered by 15 volts DC provided by an external power adapter 108, versus the 120 volts required to power internal ballast for magnifiers employing a fluorescent bulb. This is much safer and enables the present magnifiers to be adapted to any domestic or foreign power outlet simply by changing the external adapter 108.

While all the diodes in magnifiers 10, 80 provide white light, e.g., 6000° K-6500° K, it is contemplated that the diodes on some PCBs 46, 88 e.g. those at the sides of the magnifiers could provide white light, while others, e.g. those at the rear, could emit ultraviolet (UV) light. The provision of such different wavelengths to illuminate part P (FIG. 1) may enhance the examination of that part by the worker.

As seen in FIG. 10, the PCBs at the rear and opposite sides (and front for magnifier 10) of the magnifiers have separate drivers 104*a* to 104*c* and the current to the drivers is controlled by a controller 106 which receives DC power from power adaptor 108. Preferably, the controller includes a timer 110 and a dimmer 112 and is activated by an ON/OFF control switch 114 on the upper surfaces of housings 22 and 82 as shown in FIGS. 2 and 6.

The PCBs, 46, 88 are connected to each other and to the drivers by leads 115 terminated by connectors 115*a*. They may be isolated from one another by releasing the connectors so that, after removing cover 62 or 94, a defective PCB may easily be replaced simply by releasing the fastener 48 connecting that PCB to housing 22, 82 and disconnecting its one or two connectors 115*a*.

When switch 114 is depressed, that causes the controller to turn on all the diodes to the last active brightness setting of the dimmer circuit 112 which may have, say, three different settings. Successive depressions of that button cause the controller to cycle through the other settings and then turn all the diodes off.

The controller 106 may also be instructed by a SELECT switch 116 adjacent to switch 114. By using switch 116, the worker may select which PCBs (pairs of diodes) are activated when the magnifier is turned on. For example, successive depressions of that switch may cause the controller to activate only those diodes at the back of the magnifier, only those at one or the other or both sides thereof or all of them to achieve many variations of light brightness and shadowing or contrast. It could also allow selection of different light wavelengths as discussed above.

Preferably also, the controller includes a timing function or circuitry so that the magnifier turns off automatically after a selected period of time, e.g., 2-4 hours, to save energy. For example, the timing circuitry further comprises at least one programmable work-shift mode, wherein the at least one work shift mode comprises a four hour LED-on mode. The timing function may be activated by depressing both switches 114 and 116 simultaneously for, say, two seconds whereupon they blink once to confirm. Repeat the process to deactivate the timing function and the switches blink twice to confirm. The timing circuitry further includes at least one programmable work-shift mode function, wherein the at least one work shift mode may be preprogrammed to correspond to a work shift. For example, the LEDs or diodes 52*a*, 52*b* may be programmed to turn off after four hours to correspond to worker W shift break.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Finally, it will be understood that use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

What is claimed is:

1. A die-cast magnifier housing apparatus having a central axis for illuminating and magnifying a specimen, the die-cast apparatus comprising:

a plurality of thermal stanchions formed integrally with the magnifier housing, wherein each of the plurality of thermal stanchions is substantially a cuboid shape and comprises:
  a vertical side;
  a second vertical side disposed substantially opposite the first vertical side;
  a top surface disposed between the first vertical side and the second vertical side, wherein the top surface disposed between the first vertical side and the second vertical side comprises a sloping top surface wherein the sloping top surface is sloped towards the central axis;
  and
wherein each of the plurality of thermal stanchions is passively adapted to dissipate heat from the top surface to the magnifier housing.

2. The die-cast magnifier housing apparatus as in claim 1 further comprising:
  at least one LED;
  circuitry for controlling the at least one LED; and
  wherein the at least one LED is adaptable to be in thermal contact with the top surface of at least one of the thermal stanchions.

3. The die-cast magnifier housing apparatus as in claim 2 further comprising an antistatic cover adapted to attach to the underside of the magnifier housing.

4. The die-cast magnifier housing apparatus as in claim 3 wherein each of the plurality of LEDs are independently controllable.

5. The die-cast magnifier housing apparatus as in claim 4 wherein the circuitry further comprises on/off LED timing circuitry, wherein the timing circuit further comprises at least one programmable work-shift mode.

6. The die-cast magnifier housing apparatus as in claim 5 wherein each sloping top surfaces comprises a slope angle of substantially 13 degrees.

7. The die-cast magnifier housing apparatus as in claim 6 comprising an opening adapted to receive a magnifying lens, wherein the magnifying lens comprises an optical axis coincident with the central axis.

8. The die-cast magnifier housing apparatus as in claim 7 wherein the plane of the opening and the plane of the at least one LED is substantially coplanar.

9. A die-cast magnifier housing apparatus as in claim 1 further comprising a plurality of grips adaptable for gripping by hand, each of the plurality of grips comprising a Zinc alloy.

* * * * *